United States Patent [19]

Gupta

[11] Patent Number: 4,996,430

[45] Date of Patent: Feb. 26, 1991

[54] OBJECT DETECTION USING TWO CHANNEL ACTIVE OPTICAL SENSORS

[75] Inventor: Neelam Gupta, Silver Spring, Md.

[73] Assignee: The United States of America as represented by the Secretary of the Army, Washington, D.C.

[21] Appl. No.: 416,197

[22] Filed: Oct. 2, 1989

[51] Int. Cl.$^5$ ............................................. G01S 17/02
[52] U.S. Cl. ..................................... 250/339; 250/341
[58] Field of Search ...................... 250/341, 338.4, 339

[56] References Cited

U.S. PATENT DOCUMENTS

| | | | |
|---|---|---|---|
| 4,010,689 | 3/1977 | Sochard et al. | 102/213 |
| 4,224,520 | 9/1980 | Greene et al. | 250/338.4 |
| 4,369,886 | 1/1983 | Lane et al. | 209/564 |
| 4,471,222 | 9/1984 | Fowler, Jr. et al. | 250/350 |
| 4,709,142 | 11/1987 | Dahl | 250/221 |
| 4,733,081 | 3/1988 | Mizukami | 250/341 |
| 4,819,561 | 4/1989 | Born et al. | 102/213 |

OTHER PUBLICATIONS

M. Umeno, H. Hattori, T. Jimbo and M. Sakamoto, "A Dual Spectral-Band Infrared Thermo-Ratioscope," *Proceedings of ICO-11 Conference*, Madrid, Spain (Sep. 10-17, 1978) pp. 803-806.

*Primary Examiner*—Constantine Hannaher
*Attorney, Agent, or Firm*—Saul Elbaum; Guy M. Miller

[57] ABSTRACT

An apparatus for detecting target objects which exhibit ratios of reflectance values that are substantially the same at two separated wavelengths when compared with background objects having reflectance values that are substantially different at the same two wavelengths has a two channel active optical sensor and logic circuitry. A first signal is transmitted at a wavelength lambda-1 which is different from a second signal which is transmitted at a wavelength lambda-2. The two signals are directed towards an object which reflects the signals therefrom. The reflected signals are received and a ratio is calculated. The ratio is compared with a predetermined threshold value to indicate when a target object has been identified.

12 Claims, 3 Drawing Sheets

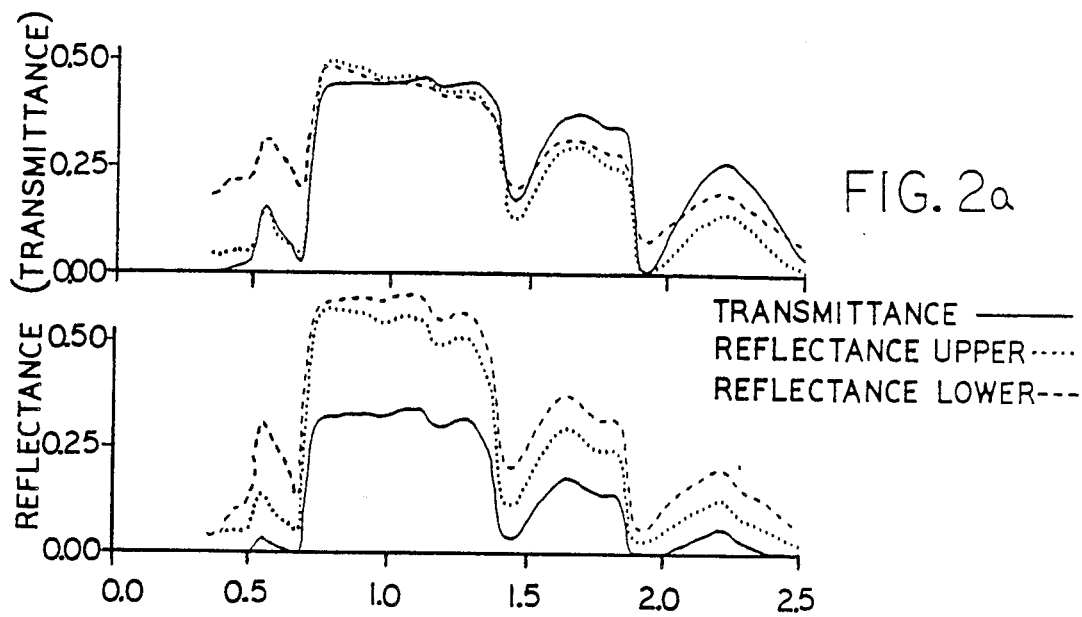
FIG. 2a
FIG. 2b
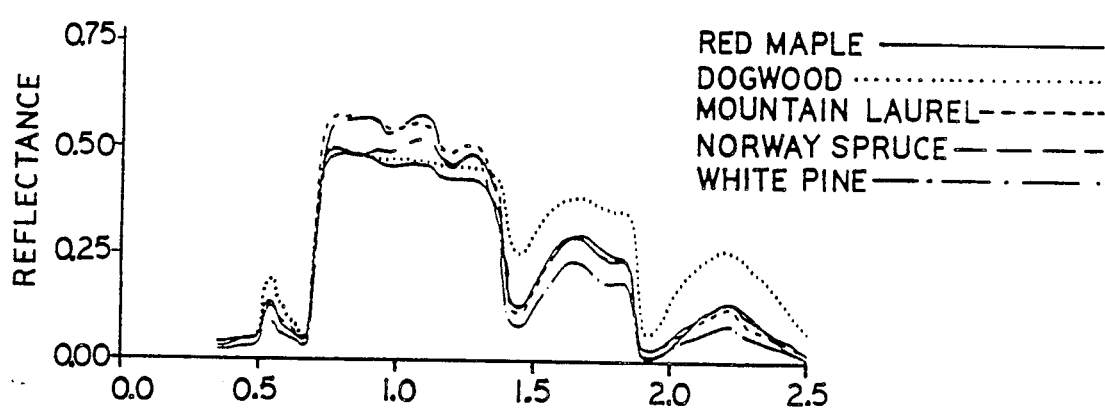
FIG. 3

OBJECT DETECTION USING TWO CHANNEL ACTIVE OPTICAL SENSORS

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the Invention

The present invention relates to target detection using active optical sensing techniques and, more particularly, is directed to a two channel active optical object sensor that takes advantage of the reflective characteristics of the object being detected as compared to the reflective characteristics of other background objects in the surrounding area.

2. Description of the Prior Art

Discriminating targets or object surfaces from their surrounding environment is an outstanding problem in a number of applications. In one application, for example, fuzes have been designed which attempt to discriminate between foliage and targets which hide under the foliage umbrella so that projectiles and missiles or the like do not prefunction on the foliage on their way to the target. So far no satisfactory solution has been found which does not require two completely separate sensing techniques such as those that use both optical and magnetic sensors. The problem is a critical one for a fuze which must provide a few meters stand-off for an anittank shaped charge, where the missile or projectile may pass near or through foliage on its way to the target.

Fuzes have existed for a long time that use active optical sensors. Until recently the primary focus of attention has been target discrimination in an aerosol environment where the backscattered returns are in general of very low amplitude with large pulse stretching. See, for example, U.S. Pat. No. 4,709,142 directed to target detection in aerosols using active optical sensors by Dahl. The discrimination has been based on using multithreshold electronic firing logic and very short pulse widths. However, optical clutter from foliage has recently started receiving attention. The problems posed by this clutter are quite different from those posed by aerosols because of the expected high amplitude of the return signals along with large pulse stretching. Since leaves are usually distributed in layers, there are multiple reflections and transmissions of the incident radiation by the leaf layers to make up the reflected pulse. The reflected pulse received at the receiver has relatively high peak amplitude and considerable amount of pulse stretching due to reflections occurring at different distances. A target/foliage discrimination scheme based on pulse stretching for an electronic logic processor has marginal success, and such a scheme may not be applicable for some systems. Similar difficulties exist in differentiating between target and foliage returns for rf fuzes.

At the present time it does not appear possible to design a logic scheme which can handle a foliage clutter problem without designing another type of sensor with an additional input channel. The current techniques in use do not adequately detect target objects. Consequently, it is desirable to be able to have an apparatus that provides better object detection techniques that can detect target objects from their surroundings.

SUMMARY OF THE INVENTION

It is therefore an object of the invention to provide an object detection system that can reliably discriminate between objects of interest or targets and background objects that appear within the surroundings.

It is a further object of the invention to provide an object detection system that uses signals that can be sensed using conventional sensors.

It is a still further object of the invention to provide an object detection system that uses only one type of sensing means (i.e., optical) for ease of use.

It is a still further object of the invention to provide an object detection device system that can discriminate between foliage and military targets.

The foregoing and other objects are attained in accordance with the invention through the use of an object or target detection system that uses two separate active optical wavelength channels strategically selected to provide maximum target discrimination. More particularly, the approach taken to solve the present discrimination problem involves selecting the two channels so that they operate at wavelengths that have been selected according to divergent reflectivity and absorption characteristics of the objects to be discriminated.

Some of the optical radiation impinging upon any surface is reflected away from the surface. Reflectivity and absorbance varies according to the properties of the surface and the wavelength. The present invention takes advantage of the different reflectivity and abosrbance characteristics objects exhibit over the range of optical wavelengths. The first channel's wavelenth is selected by observing experimental data that corresponds to a very high reflectivity from the "background" objects while the second channel's wavelength is selected to correspond to a very low reflectivity from the background objects. The ratio of these reflected signals being much greater than one or some predetermined threshold value. In addition, the reflectivity of potential target objects or surfaces should not differ much at these two wavelengths. Consequently, potential target objects coming within the sensing path of the object detector will exhibit a ratio of reflectivity values at the two separate wavelengths that will be less than or equal to one or a predetermined threshold value. After the ratio of reflectivity values have been calculated and compared with the predetermined threshold value a detection signal can be generated to indicate the presence of a target in the case of a ratio smaller than the predetermined threshold value. No detection signal will be generated in the case of a ratio larger than the predetermined threshold value. Obviously, the scheme can be reversed in which a detection signal is generated for ratios larger than the predetermined threshold value indicating the presence of objects that have contrasting reflectivity characteristics at the two selected wavelengths.

In the case of discriminating target objects from background foliage, for example, the selection criteria for the first wavelength should correspond to very high foliage reflectivity while the second wavelength should correspond to very low foliage reflectivity. The reflectivity of potential target surfaces should not differ much at these two wavelengths. To identify the best wavelengths for the two channels a study of the spectral reflectivity properties of a variety of foliage and target samples was performed as well as an investigation of available light sources and detectors. It was found that irrespective of the type of green leaf or needle, there appears to be a universal characteristic in the spectral reflectivity properties of all types of foliage. They all exhibit high absorption bands at 0.67, 1.45, 1.93, and 2.5 micrometers, and near constant maximum reflection from 0.75 to 1.3 micrometers. Therefore, one channel's wavelength is chosen in the 0.75 to 1.3 micrometer band while the other channel's wavelength is chosen among one of the high absorption bands. The data shows that 1.93 micrometers would provide the best results. Consequently, target objects coming within the sensing path of the object detector will exhibit a ratio of reflectivity values at the two separate wavelengths that will be less than one or a predetermined threshold value while the ratio of reflectivity values for foliage at the strategically chosen wavelengths will be greater than the predetermined threshold value. These calculated ratios from the two reflected signals when compared with the predetermined threshold value will indicate the presence of a target object.

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

BRIEF DESCRIPTION OF THE DRAWINGS

FIG. 2a shows plots of spectral reflectance data and transmittance data for green maple leaves at various wavelengths.

FIG. 2b shows plots of spectral reflectance data and transmittance data from mountain laurel leaves at various wavelengths.

FIG. 3 shows plots of spectral reflectance data for five different types of foliage showing a universal reflectance behavior irrespective of type of foliage.

DESCRIPTION OF THE PREFERRED EMBODIMENTS

Figure 1:
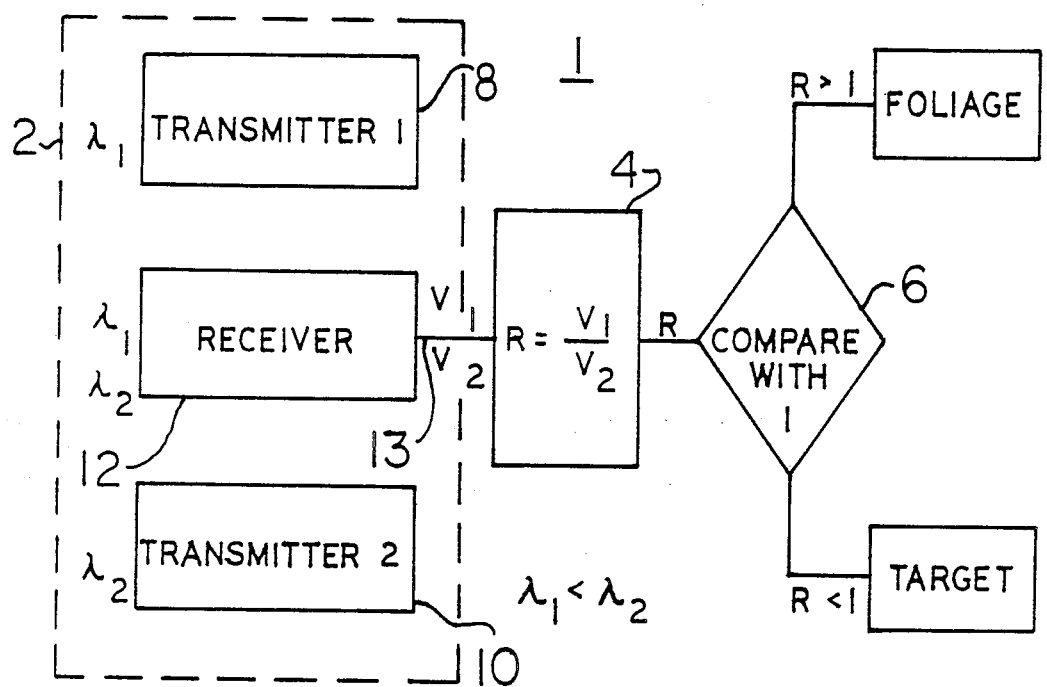
FIG. 1 shows in symbolic form a two channel active optical object detector according to an aspect of the invention.

Referring now to the drawings, like reference numerals represent identical or corresponding parts throughout the several views.

FIG. 1 shows in a block diagram a two channel active optical object detector 1 having an active optical sensor 2, a ratio calculating circuit 4 and a comparative circuit 6. The active optical sensor 2 comprises a first transmitter 8 which transmits signals at a first wavelength lambda-1, a second transmitter 10 which transmits a second signal at a wavelength lambda-2, where lambda-2 is greater than lambda-1, and a receiver 12. The transmitters 8 and 10 and receiver 12 which make up the active optical sensor 2 preferably consist of well known pulsed AlGaAs laser diodes around 0.9 micrometers (for lambda-1) and InGaAsP laser diodes at around 1.45 micrometers (for lambda-2) and an InGaAs planar PIN detector with a spectral response from 0.8 to 1.8 micrometers (manufactured by Epitaxx Inc. Model No. ETX-300VT), respectively, although the invention is not limited to the use of this particular transmitter/detector combination. The operating characteristics of the transmitters and receiver will be chosen according to object reflectivity characteristics. The first transmitter 8 transmits signals at a wavelength that corresponds to a very high reflectivity from background objects while the second transmitter 10 transmits signals at a wavelength that corresponds to a very low reflectivity from background objects. Additionally, the reflectivity of potential target objects should not differ much at these two wavelengths. Note, however, the scheme could easily be reversed choosing the wavelengths so the contrasting reflectivity characteristics are for the target object instead of the background objects. When the transmitted signals reflect off an object receiver 12 senses the reflected signals which are then processed through a high speed transimpedance preamplifier and operational amplifier which produces voltages V1 and V2 respectively at the receiver's output 13. These amplifiers are conventional and well known in the art. V1 and V2 represent reflectivity percentage values of the first and second signals respectively. These voltages are then used to calculate a ratio by any well known ratio calculating circuit 4. The ratio is then used to compare with a predetermined threshold value such as one. If the ratio calculated is greater than one comparator circuit 6 generates a signal indicating that the object is only a background object while if the ratio is calculated to be less than or equal to one then comparator circuit 6 generates a signal indicating that a target object has been identified.

The two wavelengths are chosen according to the unique reflective characteristics of the objects to be discriminated. For an active optical sensor 2 having a colocated transmitter or transmitters 8 and 10 and a receiver 12 the magnitude of the backscattered signal for a given wavelength reflected off an object is given by;

$$P_s = \frac{t_t t_r \rho_\lambda(\theta) A P_o}{\pi R^2} \quad (1)$$

where $t_t$ and $t_r$ are the transmittance factors for the transmitter and receiver optics, respectively; $\rho_\lambda(\theta)$ is the reflectivity of the object surface at an incident angle $\theta$; A is the effective collection area of the receiver lens; and $P_o$ is the peak power of the laser light source. Consequently, the backscattered signal for an active optical sensor depends upon the spectral reflectance of the target surface. The spectral reflectance of an object is defined as the fraction of the incident flux that is reflected for a given wavelength of light. Most natural or man-made objects fall between two extremes; specular and diffuse reflectors. Spectral reflectors follow Snell's law of reflection. Diffuse or Lambertian reflectors reflect light equally in all directions irrespective of the incident flux direction.

For the specific application of discriminating targets such as tanks from foliage spectral reflectance data was collected from a wide variety of foliage backgrounds and targets to identify the best wavelengths for the two channels. A large number of directional reflectance (DR) measurements were carried out. The directional reflectance is defined as the ratio of reflected flux in a hemisphere to the incident flux in a given direction. The reflectivity values used in Eq. (1) are known as the monostatic bidirectional reflectance (MBR) in which both the source and the detector are nearly colocated (as in an active optical sensor) and the reflected light in a given direction is measured for a given incident direction. There is a simple relationship between these two values. The directional reflectance (DR) value $r(\theta_i, \phi_i)$ for a given incident angle is obtained from the bidirectional reflectance (BDR) $f_r(\theta_i, \phi_i; \theta_r, \phi_r)$ through the following expression:

$$r(\theta_i, \phi_i) = \int 2\pi f_r(\theta_i, \phi_i; \theta_r, \phi_r) \, d\Omega_r \qquad (2)$$

where subscript i is for angle of incidence and r is for reflection. In MBR measurements $\theta_r \approx \theta_i$ and $\phi_r = \phi_i$, and for uniform surfaces there is no $\phi$ dependence, giving an MBR value $f(\theta_i)$, which is the same as $\rho(\theta_i)/\pi$ in Eq. (1).

The DR measurements were performed from 0.35 to 2.5 micrometers with a Varion/Cary 2390 spectrophotometer with a 4-in integrating sphere attachment to collect all the reflected light in a hemisphere for an incident beam 6° off the normal. This allows both the diffuse and the specular components of the scattered light to be collected. The interior of this sphere was coated with halon, which has a very high diffuse reflectance from 0.20 to 2.5 micrometers. All measurements are related to halon. Spectral transmittance measurements were also taken with this setup. The hemispheric reflectance/transmittance measured by this setup with near-normal incidence is known as the normal directional reflectance/transmittance.

FIG. 2a shows spectral reflectance and transmittance data for green leaves from a red maple tree while FIG. 2b shows data for a mountain laurel bush. FIG. 3 shows spectral reflectance for five different types of foliage showing a universal reflectance behavior irrespective of type of foliage. The foliage samples included a large number of deciduous broadleaf and evergreen (both leaf and needle) types. These samples included maple, dogwood, mountain laurel, white pine, and Norway spruce.

From FIG. 2 it can be seen that leaves reflect almost the same amount of radiation from their upper as from their lower surfaces, except for some minor differences at the visible wavelengths. The spectral transmittance behavior is very similar to the reflectance behavior, except for magnitude, which depends upon the thickness of the leaf. The maple leaf is more transmitting but less reflecting because it is thinner than the laurel leaf.

Figure 4:
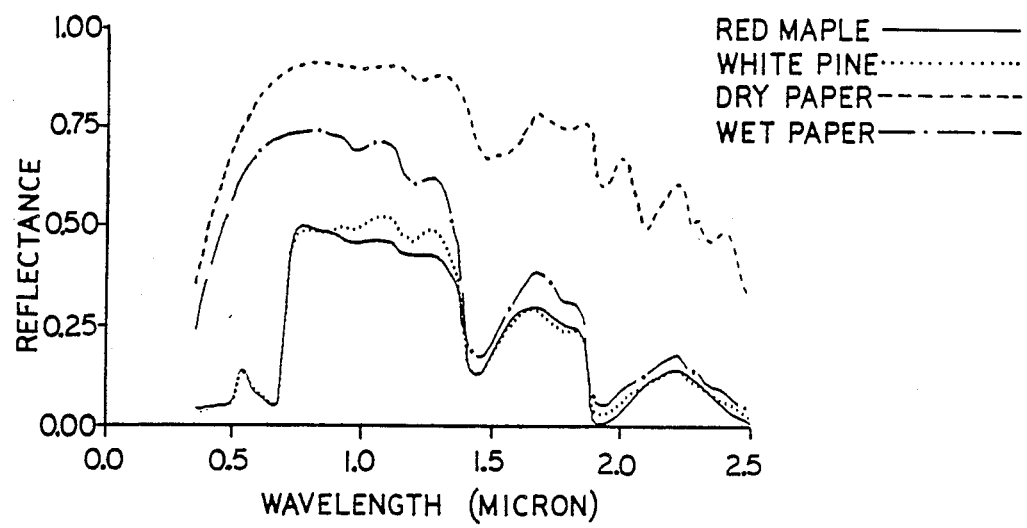
FIG. 4 shows plots of spectral reflectance data comparing two different types of foliage with dry and wet samples of blotter paper.

From FIG. 3 it can be seen that irrespective of the type of green leaf or needle, there appears to be a universal characteristic in the spectral reflectance properties of all types of foliage. They all have high absorption bands at 0.67, 1.45, 1.93, and 2.5 micrometers and near constant maximum reflection from 0.75 to 1.3 micrometers. The absorption bands at 1.45 and 1.93 micrometers arise mainly as a result of absorption due to water content of the leaves as shown in FIG. 4 which includes four spectral-reflectance curves for comparison. A dry and wet sample of blotter paper is compared with a green maple leaf and white pine needles.

Figure 5:
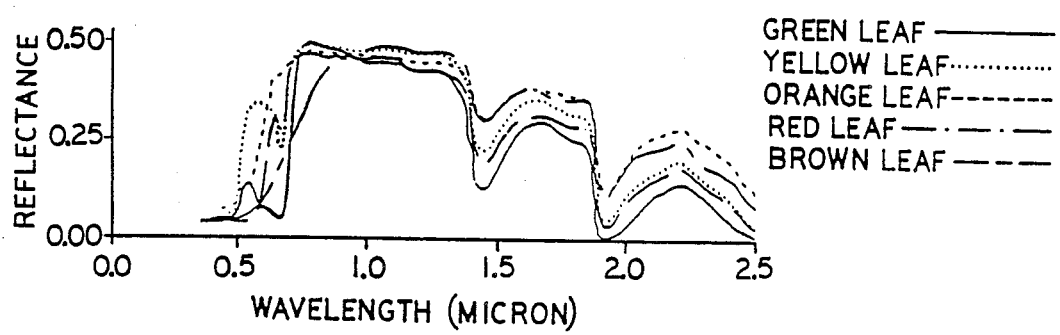
FIG. 5 shows plots of spectral reflectance data for five different color maple leaves, showing effect of change of color on spectral reflectance behavior of a leaf.

To understand the effect of seasonal changes on the deciduous samples spectral reflectance measurements were taken for five different color leaves. FIG. 5 shows the effect of change of color on spectral reflectance behavior of a maple leaf. This figure clearly shows that as the color changes the reflectance behavior is affected mainly in the visible range. The absorption band centered around 0.67 micrometers for green leaves arises from the spectral absorption caused by the chlorophyll pigments in the leaf which disappear in autumn, causing the color to change.

Figure 6:
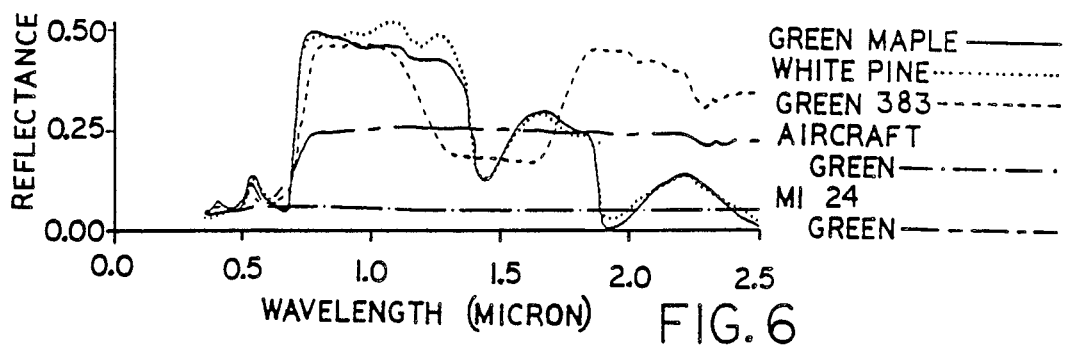
FIG. 6 shows plots of spectral reflectance data comparing two foliage types and three different types of painted surfaces.

A large number of target object samples were also measured. FIG. 6 shows comparison of spectral reflectance behavior for a green maple leaf, white pine needles, U.S. Green 383 camouflage paint, U.S. aircraft green paint and an MI-24 helicopter green painted fragment. While the U.S. aircraft green and MI-24 green show constant values from 0.7 micrometers on up, U.S. Green 383 camouflage paint follows the behavior of green foliage up to 1.5 micrometers fairly closely.

It is clear from the above data that foliage appears to have universal reflectance behavior irrespective of seasons, color, shape, size, etc. There is high reflection and transmission in the near IR (0.75 to 1.3 micrometers) and high absorption at 1.45, 1.93, and 2.5 micrometers. Most targets do not show any regular spectral reflectance behavior as compared to foliage except the U.S. Green 383 camouflage paint. Consequently, the best wavelengths to choose to discriminate targets from foliage include one channel's wavelength at 0.75 to 1.3 micrometer for high foliage reflectance and the second channel's wavelength at either 1.45, 1.9 or 2.5 micrometers for low reflectance.

As discussed above for effective discrimination between foliage and targets the invention requires the use of two channels operating at separate wavelengths. For such a device sources and detectors must be available at a wavelength in the spectral range 0.75 to 1.3 micrometers and at 1.45, 1.9 or 2.5 micrometers. While semiconductor laser diodes and detectors are preferred because of their compact size, robustness, reliability, large operating temperature, low cost, long shelf life, etc, the invention is not limited to the use of these devices. However, in a fuzing application semiconductor laser diodes and detectors are virtually required. For the 0.75 to 0.9 micrometer range, both AlGaAs/GaAs laser diodes and Si detectors are available as off-the-shelf components. For the band around 1.45 micrometers Ge detectors are available. While an InGaAs is a preferred detector a sandwich detector with both Si, responsive to 0.9 micrometers, and Ge, responsive to 1.45 micrometers, detector elements manufactured by Judson IR Inc., can be used in the receiver with an optimized achromatic lens with a focal length of 60 mm and diameter of 20 mm. RCA has produced 1.3 and 1.55 micrometer lasers which have been modified to operate in the 1.45 micrometer region. While laser diodes and detectors operating in the 1.9 micrometer region and above are in development the use of these wavelengths are not critical to the discrimination of foliage from targets by fuzes using semiconductor technology. The discrimination logic can be designed electronically by storing the incoming signals received by the receiver 12 on a pulse-by-pulse basis and taking the ratio of the two channels, and comparing it with a predetermined threshold value.

Figure 7:
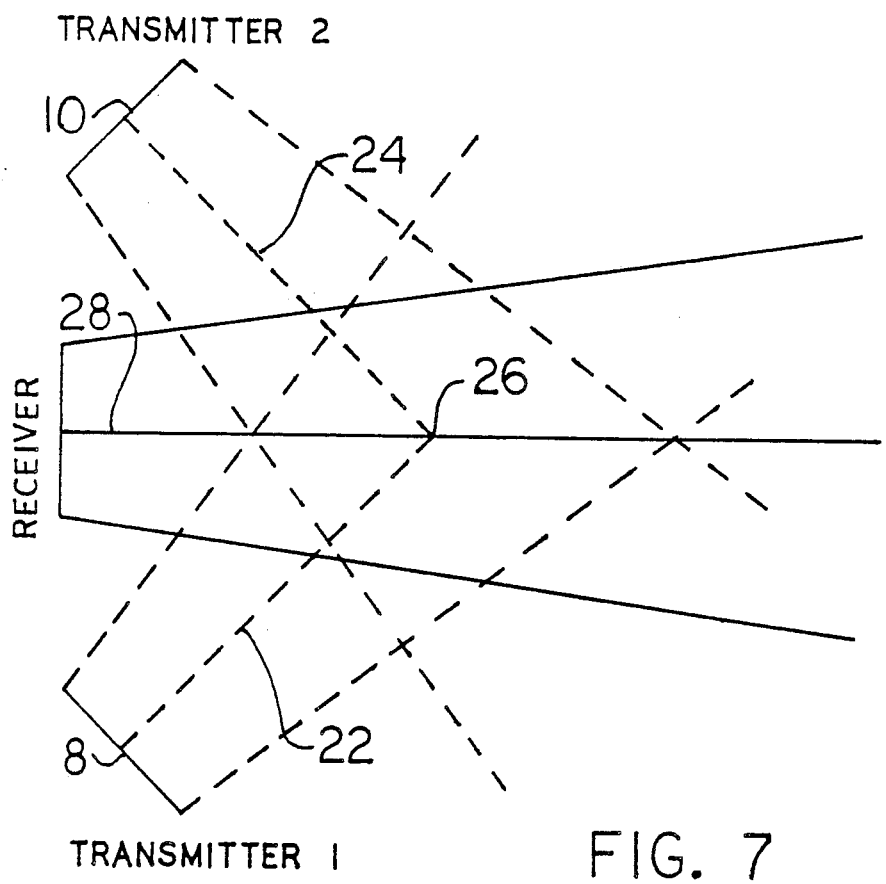
FIG. 7 shows the pencil beam patterns of a two channel optical object detector for detecting targets at specific stand off.

FIG. 7 shows pencil beam paths for an active optical sensor 2 for an embodiment in which object detection is to be performed at a predetermined position in front of the sensor 2. In this embodiment, in which the beam pattern has been exaggerated merely for clarity, the first transmitter 8 transmits a first signal along a first path 22 towards an object. The second transmitter 10 transmits a second signal along a second path 24 which intersects path 22 at a predetermined position 26 in front of the sensor 2. The predetermined position 26 is selected according to the distance in front of the sensor 2 you want to detect an object by having reflected signals return to receiver 12 by way of path 28. In this embodiment an object is sensed only when it becomes located substantially at the predetermined position 26. This embodiment is particularly suited for fuzing applications that require a particular stand off distance for projectiles with shaped charges.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for detecting objects which exhibit ratios of reflectance values at two separate wavelengths that are less than a predetermined value comprising:
    means for transmitting a first signal having a wavelength lambda-1 along a first path;
    means for transmitting simultaneously with the first signal a second signal having a wavelength lambda-2 where lambda-2 is different than lambda-1 along a second path which substantially intersects the first path at a single predetermined region along the first path;
    means for sensing the first signal and second signal reflected off an object when the object becomes located substantially at the single predetermined region; and
    means for indicating when the object has a ratio of reflectance values calculated from the reflected first and second signals that is less than the predetermined value.

2. The apparatus of claim 1 wherein said indicating means comprises:
    means for calculating a ratio of the reflected first and second signals sensed by said sensing means;
    means for comparing the ratio with the predetermined value;
    means for generating a detection signal when the ratio is less than the predetermined value.

3. A method of detecting an object which exhibits a ratio of reflectance values at two separate wavelengths that is less than a predetermined value comprising the steps of:
    transmitting a first signal at a wavelength lambda-1 along a first path;
    transmitting simultaneously with the first signal a second signal at a wavelength lambda-2 where lambda-2 is different than lambda-1 along a second path which substantially intersects the first path at a single predetermined region along the first path;
    sensing the first and second signals reflected off an object when the object becomes located substantially at the single predetermined region;
    indicating the presence of the object when the ratio of reflected first and second signals is less than the predetermined value.

4. The method of claim 3 wherein said step of indicating the presence of the object comprises:
    calculating a ratio of the first and second signals reflected off the object;
    comparing the ratio with the predetermined value;
    generating a detection signal when the ratio is less than the predetermined value.

5. An apparatus for detecting objects which exhibit ratios of reflectance values at two separate wavelengths that are less than a predetermined value comprising:
    means for transmitting a first signal having a wavelength lambda-1 along a first path;
    means for transmitting simultaneously with the first signal a second signal having a wavelength lambda-2 where lambda-2 is different than lambda-1 along a second path which substantially intersects the first path at a single predetermined region along the first path;
    means for sensing the first and second signals reflected off an object when the object becomes located substantially at the single predetermined region;
    means for indicating when the object has a ratio of reflectance percentages calculated from the reflected first and second signals that is less than the predetermined value.

6. The appartus of claim 5 wherein said means for transmitting a first signal comprises a laser diode.

7. The apparatus of claim 6 wherein said means for transmitting a second signal comprises a laser diode.

8. The apparatus of claim 5 wherein said means for sensing the first and second signals comprises a sandwich detector having Silicon responsive at the wavelength lambda-1 and Germanium responsive at the wavelength lambda-2.

9. The apparatus of claim 5 wherein lambda-1 is about 0.7 to 1.35 micrometers and lambda-2 is about 1.45 micrometers.

10. The apparatus of claim 5 wherein said means for transmitting a first signal having a wavelength lambda-1 transmits the first signal as a series of pulses.

11. The apparatus of claim 5 wherein said means for transmitting a second signal having a wavelength lambda-2 transmits the second signal as a series of pulses.

12. The apparatus of claim 5 wherein said indicating means comprises:
    means for calculating a ratio of the reflected first and second signals sensed by said sensing means;
    means for comparing the ratio with the predetermined value;
    means for generating a detection signal when the ratio is less than the predetermined value.

* * * * *